United States Patent
Shiina et al.

(10) Patent No.: US 11,212,004 B2
(45) Date of Patent: Dec. 28, 2021

(54) OPTICAL/RF WIRELESS HYBRID COMMUNICATION SYSTEM AND A CONTROL METHOD

(71) Applicant: Nippon Telegraph and Telephone Corporation, Tokyo (JP)

(72) Inventors: Ryota Shiina, Tokyo (JP); Kazutaka Hara, Tokyo (JP); Satoshi Ikeda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/262,976

(22) PCT Filed: Jul. 23, 2019

(86) PCT No.: PCT/JP2019/028808
§ 371 (c)(1),
(2) Date: Jan. 25, 2021

(87) PCT Pub. No.: WO2020/022320
PCT Pub. Date: Jan. 30, 2020

(65) Prior Publication Data
US 2021/0266071 A1   Aug. 26, 2021

(30) Foreign Application Priority Data

Jul. 25, 2018 (JP) .............................. JP2018-139565

(51) Int. Cl.
*H04B 10/00* (2013.01)
*H04B 10/2575* (2013.01)
(Continued)

(52) U.S. Cl.
CPC ..... *H04B 10/25759* (2013.01); *H04B 10/079* (2013.01); *H04B 17/309* (2015.01); *H04W 24/02* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

2002/0122230 A1   9/2002   Izadpanah et al.
2004/0037566 A1*  2/2004   Willebrand ........ H04B 10/1123
                                                    398/115
(Continued)

FOREIGN PATENT DOCUMENTS

JP    H01151328 A      6/1989
JP    2005-506718      3/2005
(Continued)

OTHER PUBLICATIONS

Shiina et al., "Optical/RF hybrid wireless system for realizing stabilized wireless environment," 2018 Electronic Information Society Conference Communications Society Conference, Sep. 11, 2018, p. 108, 12 pages (with English Translation).
(Continued)

*Primary Examiner* — Daniel G Dobson
(74) *Attorney, Agent, or Firm* — Fish & Richardson P.C.

(57) ABSTRACT

An optical/RF wireless hybrid communication system and a control method capable of solving the instability of link states of an RF wireless link and an optical wireless link is provided. According to an optical/RF wireless hybrid communication system and a control method of the present invention, when data is transmitted, the link is not limited to
(Continued)

one of an RF wireless link and an optical wireless link, a link state is determined based on signal quality received in channels of both the RF wireless link and the optical wireless link, and a distribution of data to be transmitted in each link is determined based on a result thereof. For this reason, the link can be switched according to circumstances of the transmission state due to an external disturbance and the like.

8 Claims, 5 Drawing Sheets

(51) Int. Cl.
  H04B 10/079 (2013.01)
  H04W 24/02 (2009.01)
  H04B 17/309 (2015.01)
  H04J 14/00 (2006.01)

(58) Field of Classification Search
  CPC ............ H04B 10/1127; H04B 10/1129; H04B 10/114; H04B 10/1141; H04B 10/1143; H04B 10/1149; H04B 10/116; H04B 10/118
  See application file for complete search history.

(56) References Cited

U.S. PATENT DOCUMENTS

| | | |
|---|---|---|
| 2008/0170540 A1 | 7/2008 | Fukuda |
| 2013/0129341 A1* | 5/2013 | D'Errico ............ H04B 10/1123 398/5 |
| 2013/0142045 A1 | 6/2013 | Nakamura et al. |
| 2019/0261262 A1* | 8/2019 | Stiles .................. H04L 47/2441 |

FOREIGN PATENT DOCUMENTS

| | | |
|---|---|---|
| JP | 2008-177754 | 7/2008 |
| JP | 2011-61253 | 3/2011 |
| JP | 2011-166251 | 8/2011 |
| WO | WO 2008/053553 | 5/2008 |
| WO | WO 2012/114728 | 8/2012 |

OTHER PUBLICATIONS

Tsai et al., "A 50 m/320 Gbps DWDM FSO communication," IEEE Photonics Conference (IPC), 2016, pp. 43-44.

Yamada et al., "Trends in International Standardization of Wireless LAN-related Systems," Communication Society Magazine, 2016, 38:74-79, 13 pages (with English Translation).

Zhang et al., "4.05-GB/s RGB LED-based VLC system utilizing PS-Manchester coded Nyquist PAM-8 modulation and hybrid time-frequency domain equalization," Proc OFC, 2017, 3 pages.

* cited by examiner

| SIGNAL QUALITY DETERMINATION | MEASUREMENT PARAMETER | | | |
|---|---|---|---|---|
| | 001 | 010 | 111 | |
| | CNR[dB] | MER[dB] | EVM[%] | ... |
| 00000 | CNR≧40 | MER≧42 | EVM<0.5 | ... |
| 00001 | 39≦CNR<40 | 41≦MER<42 | 0.5<EVM≦1.0 | ... |
| 00010 | 38≦CNR<39 | 40≦MER<41 | 1.0<EVM≦1.5 | ... |
| ... | ... | ... | ... | ... |
| 11111 | CNR<10 | MER<12 | EVM≧35 | ... |

Fig. 9

| LINK INFORMATION RF\| LIGHT | DISTRIBUTION RATIO BETWEEN LINKS (%) ||
|---|---|---|
| | RF WIRELESS | OPTICAL WIRELESS |
| 00000\|00000 | 0 | 100 |
| 00000\|00010 | 30 | 70 |
| 00010\|01000 | 60 | 40 |
| ... | ... | ... |
| 00011\|11111 | 100 | 0 |

Fig. 10

OPTICAL/RF WIRELESS HYBRID COMMUNICATION SYSTEM AND A CONTROL METHOD

CROSS-REFERENCE TO RELATED APPLICATIONS

This application is a National Stage application under 35 U.S.C. § 371 of International Application No. PCT/JP2019/028808, having an International Filing Date of Jul. 23, 2019, which claims priority to Japanese Application Serial No. 2018-139565, filed on Jul. 25, 2018. The disclosure of the prior application is considered part of the disclosure of this application, and is incorporated in its entirety into this application.

TECHNICAL FIELD

The present disclosure relates to an optical/RF wireless hybrid communication system that transmits data over channels of an RF wireless link and an optical wireless link and a control method thereof.

BACKGROUND ART

High-speed Internet services using Fiber-To-The-Home (FTTH) and Long Term Evolution (LTE) have become essential tools in daily life. Particularly, in recent years, in accordance with the widespread use of cloud services and expansion of the use of mobile terminals, a wide variety of applications and services including not only IP data communication but also Internet of Things (IOT)/Machine to Machine (M2M), a 4K/8K high definition motion picture distribution service, online motion picture distribution services, uploading of motion picture videos using SNS, and the like have rapidly become widespread. Furthermore, new workstyles such as teleworking utilizing ICT and the like have been proposed, and it is expected that the demand for services using networks will increase in the future as well. Currently, in accordance with the widespread use of FTTH, a stable optical broadband service is provided to homes, and wireless communication systems realizing a high throughput are required also in home environments from the point of view of utilizing multiple devices other than a PC and handling cable wirings with the background of the service diversification described above.

Wireless communication systems essentially can be classified into two types with 3 THz as a boundary from the point of view of the frequency domain. A frequency band of 3 THz or less is referred to as a radio wave region, and examples of systems using such a frequency band include a cellular system such as LTE or 5G and a wireless LAN using an unlicensed band. This region has been actively researched and developed and enables implementation of a high throughput by expanding the frequency band that is used and using a high frequency band. Regarding the expansion of a frequency band, for example, there is also a report describing that a high throughput can be realized by utilizing advanced technologies such as a multi-valued modulation system, control of a sub carrier spacing, an MIMO technology performing data transmission/data reception using a plurality of antennas, and the like using frequency bands of 2.4 GHz and 5.2 GHz (Non Patent Literature 1). In addition, regarding the use of a high frequency band, the use of a 60 GHz band is permitted by the Ministry of Internal Affairs and Communications in Japan and in recent years, wireless LAN standards utilizing a millimeter radio wave band such as IEEE802.11ad, which is not regulated by the Radio Act, have been established. However, there is concern that devices using a millimeter radio wave band have high power consumption and incur high costs, and it is considered that there is a high barrier to the rapid spread of wireless LAN standards of a millimeter radio wave band in the future.

On the other hand, a frequency band of 3 THz or higher (30 PHz or less) is referred to as a light wave region, and, as examples of systems using such a frequency band, there is a method using infrared communication or visible light, and, in recent years, there has been Li-Fi in which transmission/reception is performed by modulating an LED used for lighting at a high speed. This region has a high frequency band and thus enables a high throughput relatively easily by using a simple transmission/reception configuration according to an intensity-modulation-direct detection (IM-DD) system. At the research level, there has been a transmission test of 1 m/4 Gbps using wavelength division multiplexing (WDM) and 8 PAM using an LED that is incoherent light and a report of 50 m/320 Gbps using 8-wavelength dense WDM (DWDM) at the interval of 50 GHz using coherent light (Non Patent Literature 2 and 3).

CITATION LIST

Patent Literature

Patent Literature 1: Japanese Unexamined Patent Application Publication No. 2005-506718

Non Patent Literature

Non Patent Literature 1: Arika Yamada, Daisuke Nojima, and Takahiro Asai, "International standardization trends in wireless LAN related systems", The Institute of Electronics, Information and Communication Engineers Society Magazine, No. 38, Autumn Issue, p. 74-79, 2016

Non Patent Literature 2: Mengjie Zhang, Meng Shi, Fumin Wang, Jiaqi Zhao, Yingjun Zhou, Zhixin Wang, Nan Chi, "4.05-Gb/s RGB LED-based VLC system utilizing PS-Manchester coded Nyquist PAM-8 modulation and hybrid time-frequency domain equalization", Proc OFC2017, W2A.42.

Non Patent Literature 3: Wen-Shing Tsai, Hai-Han Lu, Chung-Yi Li, Ting-Chieh Lu, Hung-Hsien Lin, Bo-Rui Chen, Chang-Jen Wu, "A 50 m/320 Gbps DWDM FSO communication", IEEE Photonics Conference (IPC), p. 43-44, 2016.

SUMMARY OF THE INVENTION

Technical Problem

In a wireless communication system of a radio wave region or a light wave region, although a high throughput can be expected using the methods described above, there are the following problems in each radio communication system from the point of view of stability of a communication state of a wireless link.

(Problem According to Use of Frequency Band of Radio Wave Region)
Degradation of communication quality due to multi-path fading
Reduction of throughput due to radio wave interference
(Problem According to Use of Frequency Band of Light Wave Region)
Being unable to perform propagation through obstacles (disconnection of communication in a case that there is an obstacle in a path)

Such problems can be overcome using a hybrid wireless communication system in which a radio communication system using a frequency band of a radio wave region and a wireless communication system using a frequency band of a light wave region are linked with each other. More specifically, details are as follows.
(Problem According to Use of Frequency Band of Radio Wave Region and Solving Means)
Degradation of communication quality due to multi-path fading
Using feature of (light wave region) directivity being extremely high
Reduction of throughput due to radio wave interference
Using feature of crosstalk due to (light wave region) light wave interference being low
(Problem According to Use of Frequency Band of Light Wave Region and Resolving Means)
Being unable to perform propagation through obstacles (disconnection of communication in a case that there is an obstacle in a path)
Using (radio wave region) diffraction effect and transmission of radio wave depending on used frequency band In this way, in a case that only a wireless communication system of any one of the radio wave region and the light wave region is used, although the communication state becomes unstable due to the problems described above, by complementing disadvantages (the problems described above) of one system using advantages of the other, a stable wireless link not influenced by a radio wave state and a communication band can be constructed. The hybrid wireless communication system described above is also effective from the point of view of securing frequency resources of the radio wave region by using the frequency band of the light wave region that is not regulated by the Radio Act.

Hybrid communication systems using frequency bands of the radio wave region and the light wave region described above have already been proposed, and, in Patent Literature 1, RF wireless and optical wireless hybrid communication links are employed, and each link state is determined by including weather forecasts, a weather device inside a controller, or a function for monitoring transmission/reception power. However, according to Patent Literature 1, although each wireless link state is determined based on the transmission/reception power, for example, the multi-path fading described above markedly changes a reception intensity due to interferences between signals according to propagation through different paths, and, consequently, the throughput may be lowered, and degradation of the signal quality due to a waveform distortion (jitter) according to an arrival time difference (transmission delay change) between a radio wave and a light wave may be assumed. Therefore, the link state cannot be determined only based on the transmission/reception power of each link. Furthermore, in Patent Literature 1, after the link state is determined using the technique described above, it is illustrated that an RF wireless link or an optical wireless link is uniquely determined and used. This indicates that either the RF wireless link or the optical wireless link is used when data is transmitted, which does not solve the instability of the link state according to the problems described above.

Thus, an object of the present invention is to provide an optical/RF wireless hybrid communication system and a control method capable of solving the instability of link states of an RF wireless link and an optical wireless link.

Means for Solving the Problem

In order to achieve the object described above, an optical/RF wireless hybrid communication system according to the present invention determines a link state from signal quality received in both channels of a RF wireless link and an optical wireless link and determines a distribution of data to be transmitted in each link based on a result of the determination.

More specifically, an optical/RF wireless hybrid communication system according to the present invention is an optical/RF wireless hybrid communication system transmitting data using channels of an RF wireless link and an optical wireless link, the optical/RF wireless hybrid communication system including: a signal quality measuring unit configured to measure signal quality of data transmitted in the channel of the RF wireless link and signal quality of data transmitted in the channel of the optical wireless link; a proportion determining unit configured to determine proportions of data to be transmitted in the channel of the RF wireless link and data to be transmitted in the channel of the optical wireless link based on the signal quality measured by the signal quality measuring unit; and a switching unit configured to distribute data to be transmitted to both or one of the channel of the RF wireless link and the channel of the optical wireless link based on the proportions determined by the proportion determining unit.

In addition, a control method according to the present invention is a method of controlling an optical/RF wireless hybrid communication system transmitting data using channels of an RF wireless link and an optical wireless link, the control method including: measuring signal quality of data transmitted in the channel of the RF wireless link and signal quality of data transmitted in the channel of the optical wireless link; determining proportions of data to be transmitted in the channel of the RF wireless link and data to be transmitted in the channel of the optical wireless link based on the signal quality measured in the measuring of signal quality; and distributing data to be transmitted to both or one of the channel of the RF wireless link and the channel of the optical wireless link based on the proportions determined in the determining of proportions.

According to the optical/RF wireless hybrid communication system and the control method of the present invention, when data is transmitted, the link is not limited to one of an RF wireless link and an optical wireless link, a link state is determined based on signal quality received in channels of both the RF wireless link and the optical wireless link, and a distribution of data to be transmitted in each link is determined based on a result thereof. For this reason, the link can be switched according to circumstances of the transmission state due to an external disturbance and the like. Therefore, the present invention can provide an optical/RF wireless hybrid communication system and a control method capable of solving the instability of the link state of the RF wireless link and the optical wireless link.

In the optical/RF wireless hybrid communication system according to the present invention, it is preferable to further include a signal intensity measuring unit configured to measure a signal intensity of the data transmitted in the channel of the RF wireless link and a signal intensity of the data transmitted in the channel of the optical wireless link, cause the signal quality measuring unit to measure, in a case that the measured signal intensity is stronger than a predetermined threshold, the signal quality of the data, and assume, in a case that the measured signal intensity is weaker than the predetermined threshold, that the signal quality of the data is measured to be specific quality without causing the signal quality measuring unit to measure the signal quality of the data.

In addition, it is preferable that the control method according to the present invention should further include: measuring a signal intensity of the data transmitted in the channel of the RF wireless link and a signal intensity of the data transmitted in the channel of the optical wireless link; and performing, in a case that the measured signal intensity is stronger than a predetermined threshold, the measuring of signal intensity and assuming, in a case that the measured signal intensity is weaker than the predetermined threshold, that the signal quality of the data is measured to be specific quality without performing the measuring of signal quality.

By disposing a mechanism that measures a signal intensity of each link in a stage prior to the stage in which the signal quality is measured, signal transmission can be stabilized, and the process up to the generation of link information can be performed at a high speed.

The optical/RF wireless hybrid communication system according to the present invention may further include: a DEMUX unit configured to divide input data into data of a predetermined length; a control data assigning unit configured to assign control information based on the proportions determined by the proportion determining unit to the data divided by the DEMUX unit; and a MUX unit configured to recombine the data that is divided by the DEMUX unit and is transmitted through the channel of the RF wireless link or the channel of the optical wireless link based on the control information assigned to the data, and the switching unit distributes the data divided by the DEMUX unit to the channel of the RF wireless link or the channel of the optical wireless link based on the control information assigned to the data to transmit the input data.

In addition, the control method according to the present invention may further include: dividing input data into data of a predetermined length; assigning control information based on the proportions determined in the determining of proportions to the data divided in the dividing of the input data; and recombining the data that is divided in the dividing of the input data and is transmitted through the channel of the RF wireless link or the channel of the optical wireless link based on the control information assigned to the data, and, the distributing of the data includes distributing the data divided in the dividing of the input data to the channel of the RF wireless link or the channel of the optical wireless link based on the control information assigned to the data.

Furthermore, in the optical/RF wireless hybrid communication system according to the present invention, in bidirectional communication, it is preferable that data should be transmitted by distributing the data to both the channels of the RF wireless link and the optical wireless link in one direction, and data is transmitted using only the RF wireless link in the other direction.

In addition, in the control method according to the present invention, it is preferable that, in a case that the optical/RF wireless hybrid communication system performs bidirectional communication, data is transmitted by distributing the data to both the channels of the RF wireless link and the optical wireless link in one direction, and data is transmitted using only the RF wireless link in the other direction.

By performing optical/RF wireless hybrid communication only in a downlink direction in bidirectional communication between a master station and a terminal, an optical transmitter for uploading data does not need to be provided in a terminal, and thus the cost can be reduced.

Effects of the Invention

According to the present invention, by combining the RF wireless communication system and the optical wireless communication system, in an RF/optical wireless hybrid communication system realizing securement of frequency resources of a radio wave region in a wireless transmission section and a high throughput, link states are determined from signal quality received from channels of both the RF wireless link and the optical wireless link, and a distribution of data to be transmitted in each link is determined based on a result of the determination.

Therefore, the present invention can provide an optical/RF wireless hybrid communication system and a control method capable of solving the instability of the link state of the RF wireless link and the optical wireless link.

DESCRIPTION OF EMBODIMENTS

Hereinafter, embodiments of the present invention will be described with reference to the drawings. The embodiments described below are examples of the present invention, and the present invention is not limited to the following embodiments. In this specification and the drawings, constituent elements having the identical reference signs are assumed to be the same.

First Embodiment

Figure 1:
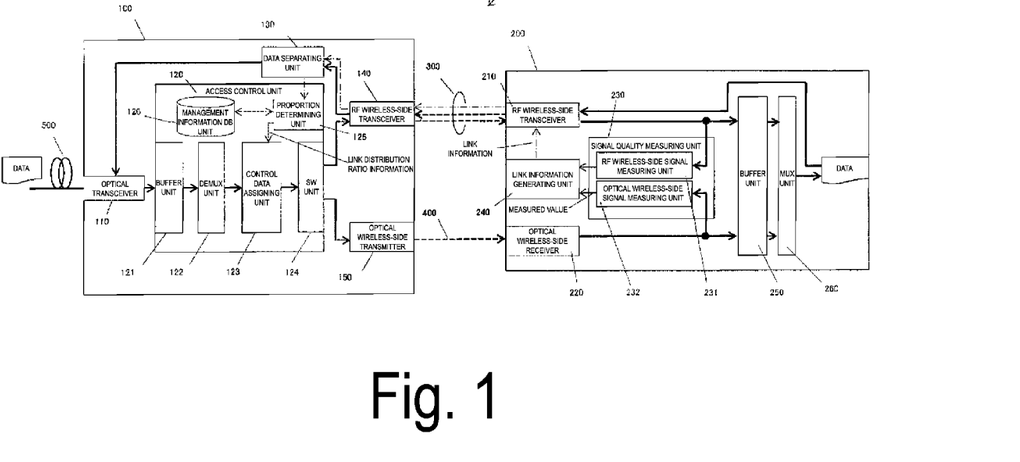
FIG. 1 is a diagram illustrating an optical/RF wireless hybrid communication system according to the present invention.

FIG. 1 is a diagram illustrating an optical/RF wireless hybrid communication system 301 according to this embodiment. The optical/RF wireless hybrid communication system 301 is an optical/RF wireless hybrid communication system that transmits data using channels of an RF wireless link 300 and an optical wireless link 400.

The optical/RF wireless hybrid communication system 301 includes a signal quality measuring unit 230, a proportion determining unit 125, and a distribution unit 124. The signal quality measuring unit 230 measures signal quality of data transmitted in the channel of the RF wireless link 300 and signal quality of data transmitted in the channel of the optical wireless link 400. Based on the signal quality measured by the signal quality measuring unit 230, the proportion determining unit 125 determines proportions of the data to be transmitted on the channel of the RF wireless link 300 and the channel of the optical wireless link 400.

Based on a proportion determined by the proportion determining unit 125, the distribution unit 124 distributes data to be transmitted to both or one of the channel of the RF wireless link 300 and the channel of the optical wireless link 400.

In FIG. 1 and subsequent drawings, reference sign 1xx denotes an apparatus/device installed on a master station 100 side, and reference sign 2xx denotes an apparatus/device installed on a terminal 200 side. Reference sign 300 denotes an RF wireless link for transmitting/receiving data between the master station and the terminal using a frequency band of a radio wave region (hereinafter, referred to as an RF wireless frequency band), and reference sign 400 denotes an optical wireless link for transmitting/receiving data between the master station and the terminal using a frequency band of a light wave region.

Reference sign 110 denotes an optical transceiver for receiving a downlink optical signal transmitted from a host station such as a relay station to the master station 100 through a fiber transmission line 500 or transmitting uplink data transmitted from the terminal 200 side to the host station as an optical signal. Reference sign 120 denotes an access control unit and is composed of a buffer unit 121, a DEMUX unit 122 that divides data, a control data assigning unit 123 that assigns control data, which is used for distributing data to the RF wireless link or the optical wireless link, to divided data, a SW unit 124 that distributes data to the RF wireless link or the optical wireless link based on the control data assigned by the control data assigning unit 123, a proportion determining unit 125 that determines a distribution ratio of data for the RF wireless link or the optical wireless link, and a management information DB unit 126 in which a table of distribution ratios calculated in advance in accordance with signal quality states of the RF wireless link and the optical wireless link are stored.

In addition, reference sign 130 denotes a data separating unit that is used for separating multiplexed uplink data and link information representing a link state used for distribution determination. Reference sign 140 denotes a transceiver on the RF wireless link side and reference sign 150 denotes a transmitter on the optical wireless link side.

Reference sign 210 denotes a transceiver on the wireless link 300 side, reference sign 220 denotes an optical receiver on the optical wireless link 400 side, and reference sign 230 denotes a signal quality measuring unit that taps parts of signals output from a receiver on the RF wireless link side and the optical receiver on the optical wireless link side and measures signal quality of each of the received signals. The signal quality measuring unit 230 is composed of an RF wireless-side signal measuring unit 231 and an optical wireless-side signal measuring unit 232.

Reference sign 240 denotes a link information generating unit that generates link information from measured values measured by the signal quality measuring unit 230. Reference sign 250 denotes a buffer unit. Reference sign 260 denotes a MUX unit that reconstructs the data from reception data received using the RF wireless link and the optical wireless link in accordance with a division rule of the DEMUX unit 122 of the access control unit 120.

Figure 2:
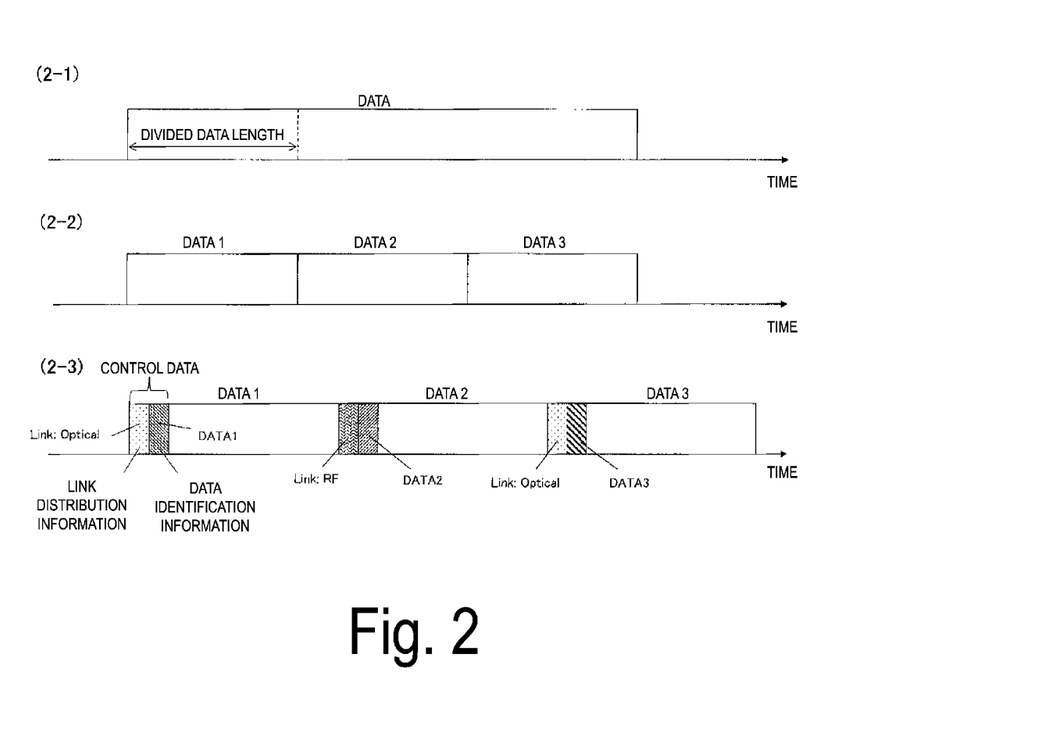
FIG. 2 is a diagram illustrating data division and control data assignment performed by the optical/RF wireless hybrid communication system according to the present invention.

Next, the flows of data and control data will be described. Data transmitted to the master station 100 through the fiber transmission line 500 is received by the optical transceiver 110 as an optical signal and is converted into an electrical signal. The converted signal is buffered by the buffer unit 121 and is divided into a data length determined in advance by the DEMUX unit 122. FIG. 2-1 is a data sequence before division, and FIG. 2-2 is a data sequence after division. The data division length is set as a parameter by the access control unit. In a case that the length of input data is not an integer multiple of the length of divided data, the divided data is padded by the DEMUX unit 122.

The control data assigning unit 123 assigns control data to a leading portion of the data divided by the DEMUX unit 122. FIG. 2-3 is an example of a data sequence to which control data has been assigned. The control data is composed of link distribution information of the RF wireless link and the optical wireless link and data identification information in which an address of the divided data (for example, the k-th data 1) is recorded. A distribution ratio between the RF wireless link and the optical wireless link is determined based on link distribution ratio information output from the proportion determining unit 125. For example, the distribution ratio can be dynamically determined such 30% for the RF wireless link and 70% for the optical wireless link, or the like. More specifically, one data sequence as illustrated in FIG. 2-1 is divided as illustrated in FIG. 2-2, and 30% of the divided data is distributed to the RF wireless link, and 70% of the divided data is distributed to the optical wireless link. The distribution of data is performed in accordance with the distribution ratio so as not to be inclined toward one link. For example, after two pieces of data are distributed to the optical wireless link, one piece of data is distributed to the RF wireless link.

In this way, the data to which control data has been assigned is distributed to the RF wireless link and the optical wireless link based on the link distribution information by the SW unit 124. The RF wireless-side transceiver 140 and the optical wireless-side transmitter 150 transmit distributed data in the SW unit 124 to the terminal 200 respectively through the RF wireless link 300 and the optical wireless link 400.

The transmitted data is converted into an electrical signal by the RF wireless-side transceiver 210 and the optical wireless-side receiver 220 inside the terminal 200 and then is processed to be received through identification, reproduction, and the like. Here, parts of signals output from the RF wireless-side transceiver 210 and the optical wireless-side receiver 220 are tapped by dividers or the like, and the signal quality is measured by the signal quality measuring unit 230. The signal quality of the signal output from the RF wireless-side transceiver 210 is measured by the RF wireless-side signal quality measuring unit 231, and the signal quality of the signal output from the optical wireless-side receiver 220 is measured by the optical wireless-side signal quality measuring unit 232.

As examples of the signal quality of each link that is measured, there are a Signal to Noise ratio (SNR), a Carrier to Noise Ratio (CNR), a Modulation Error Ratio (MER), an Error-Vector Magnitude (EVM), a Relative Constellation Error (RCE), a Bit Error Rate (BER), a Frame Error Rate (FER), and the like.

Figure 4:
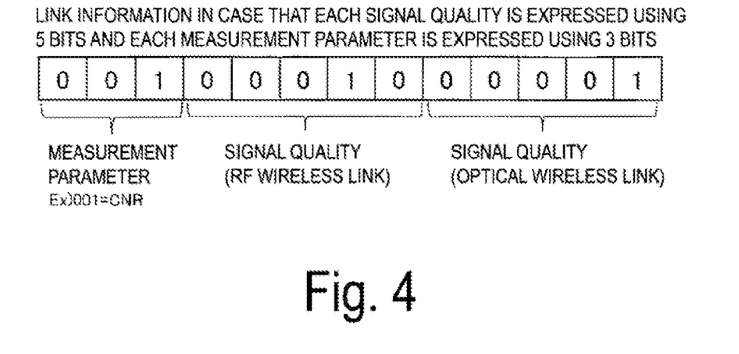
FIG. 4 is an example of link information used by the optical/RF wireless hybrid communication system according to the present invention.
Figure 9:
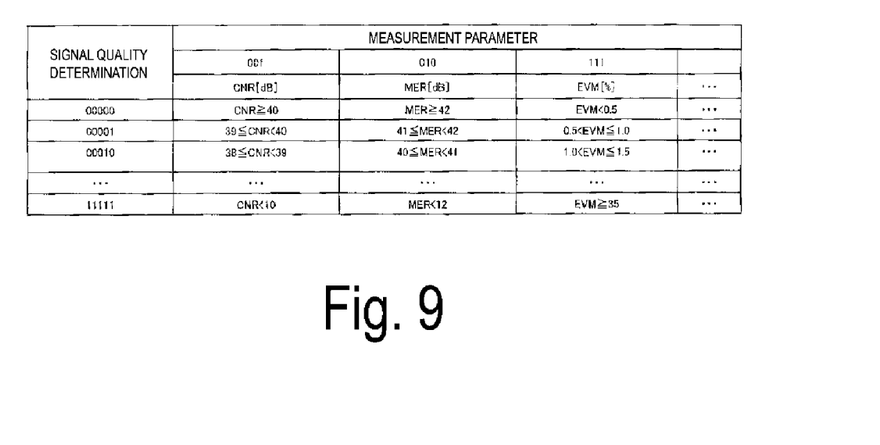
FIG. 9 is an example of a table of parameters corresponding to signal quality included in the optical/RF wireless hybrid communication system according to the present invention.

A measured value of the signal quality is input to the link information generating unit 240. Link information in which both signal quality and a measurement parameter of signals transmitted through the downlink RF wireless link and the optical wireless link are written is generated by the link information generating unit 240. The link information has an N-bit field and, for example, as illustrated in FIG. 4, can be represented as a bit sequence in which the signal quality of each of the RF wireless link and the optical wireless link is represented using 5 bits, and measurement parameter information of the signal quality is represented using 3 bits FIG. 9 illustrates details of the signal quality and measured values of measurement parameters described in the link information of FIG. 4 and correspondence relations thereof. For example, in a case that the CNR is used as a parameter, a measurement parameter as described in the link information can be set as 001. For example, in a case that the CNR is equal to or higher than 40 dB, 00000 is described as the signal quality in the link information. Thus, the link information illustrated in FIG. 4 represents that the CNR is used as a measurement parameter, the CNR of the RF wireless link is in the range of 38≤CNR [DB]<39, and the CNR of the optical wireless link is in the range 39≤CNR [DB]<40. Here, the bit length of the link information can be changed in accordance with an accuracy of the signal quality and the number of measurement parameters, and the allocation of bits of each measurement parameter and the signal quality is arbitrary.

The link information generated in this way is input to the RF wireless-side transceiver 210 and is transmitted to the master station 100 through the RF wireless link 300.

Figure 3:
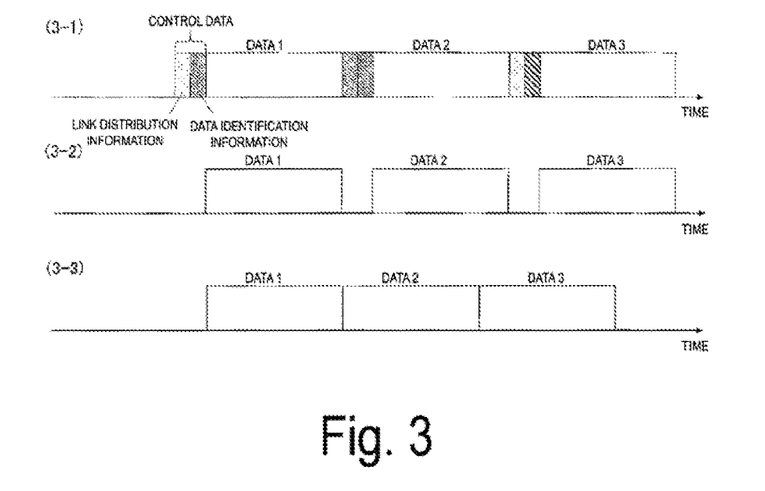
FIG. 3 is a diagram illustrating recombination of data performed by the optical/RF wireless hybrid communication system according to the present invention.

On the other hand, parts of data output from the RF wireless-side transceiver 210 and the optical wireless-side receiver 220 are buffered by the buffer unit 250 and then are re-combined by the MUX unit 260. FIG. 3 illustrates an example of re-combination. First, arrived data is arranged based on data identification information as illustrated in FIG. 3-1, and thereafter, control data is deleted. As illustrated in FIG. 3-2, an interval corresponding to bits to which control data is assigned is generated between data, and thus, each data interval is adjusted as illustrated in FIG. 3-3 by buffering or the like. In a case that data is deficient in the RF wireless link or the optical wireless link, the deficient data portion is complemented by null padding or the like, whereby a change in the data length is avoided. In this way, the data recombined by the MUX unit 250 is output from the terminal 200.

In this embodiment, only the RF wireless link is used for data transmission in an uplink direction (a direction from the terminal 200 to the master station 100). By limiting the optical wireless link side to only the downlink direction, an optical transmitter for uploading data is not necessary in the terminal 200, and the cost can be reduced. As can be ascertained also from a total traffic report of the Ministry of Internal Affairs and Communications, upload traffic is about ⅕ of download traffic, and thus the upload side is sufficient only using the RF wireless link.

Uplink data generated inside the terminal 200 or outside the terminal 200 is transmitted to the master station 100 through the RF wireless link 300 by the RF wireless-side transceiver 210. At this time, the uplink data is multiplexed with the link information output from the link information generating unit 240 and is transmitted to the master station 100. For the data that has been processed to be received by the RF wireless-side transceiver 140 of the master station 100, a process of separating the uplink data and the link information is performed by the data separating unit 130. Here, the link information separated by the data separating unit 130 is input to the proportion determining unit 125.

Figure 10:
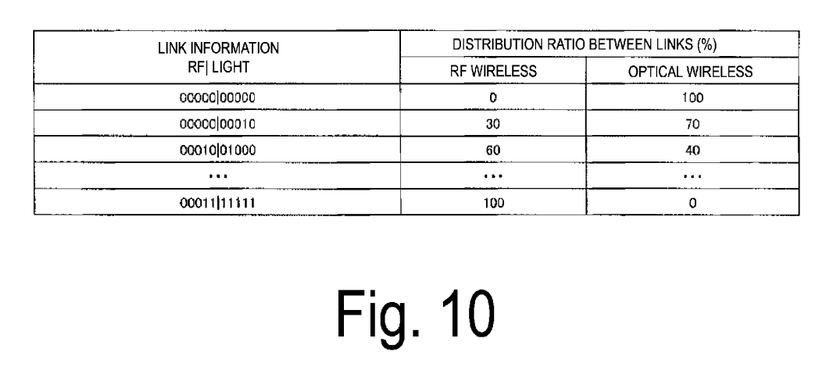
FIG. 10 is an example of a table of a management information DB included in the optical/RF wireless hybrid communication system according to the present invention.

The proportion determining unit 125 generates link distribution ratio information designating a distribution ratio between the links. This link distribution ratio information is generated in accordance with an optimal distribution ratio according to the signal quality of the links formed as a database by the management information DB unit 126. For example, the management information DB stores a table of link information and a distribution ratio of the links as illustrated in FIG. 10 for each measurement parameter. The proportion determining unit 125 determines a distribution ratio of a link corresponding to the input link information based on the table. The proportion determining unit 125 outputs the determined distribution ratio to the control data assigning unit 123 as link distribution ratio information. The control data assigning unit 123 assigns the link distribution information corresponding to the input link distribution ratio information to downlink data.

In the table illustrated in FIG. 9, when a correspondence relation between a value of the signal quality and a measured value of each measurement parameter is set such that the signal quality is equal between the measurement parameters for the value of the same signal quality, the table illustrated in FIG. 10 can be commonly used for each measurement parameter and does not need to be maintained for each measurement parameter. In this case, the information of the measurement parameter can be omitted in the link information illustrated in FIG. 4.

The uplink data separated by the data separating unit 130 is input to the optical transceiver 110. In the optical transceiver 110, an electrical signal from the data separating unit 130 is converted into an optical signal, and the optical signal is transmitted to a higher-rank network through the optical fiber transmission line 500.

In this way, the optical/RF wireless hybrid communication system 301 combines the RF wireless communication system using the RF wireless frequency band and the optical wireless communication system using the frequency band of the optical region, determines the link state from the signal quality of the signals received through both channels, and determines a distribution ratio between the links in the master station. By dynamically setting the proportion between the RF wireless link and the optical wireless link, the optical/RF wireless hybrid communication system 301 provides stable wireless communication not depending on the state of the radio wave and the communication band, and securement of frequency resources of the radio wave region in the radio transmission section and a further higher throughput can be realized.

In this embodiment, a configuration of an inbound system in which the link information is superimposed on an uplink signal, and the link information and the uplink data are separated by the data separating unit 130 has been described. On the other hand, also in an outbound system in which the link information and the uplink signal use different frequencies, a similar effect can be acquired by using a band-pass filter that transmits/blocks specific frequencies instead of the data separating unit 130.

Second Embodiment

Figure 5:
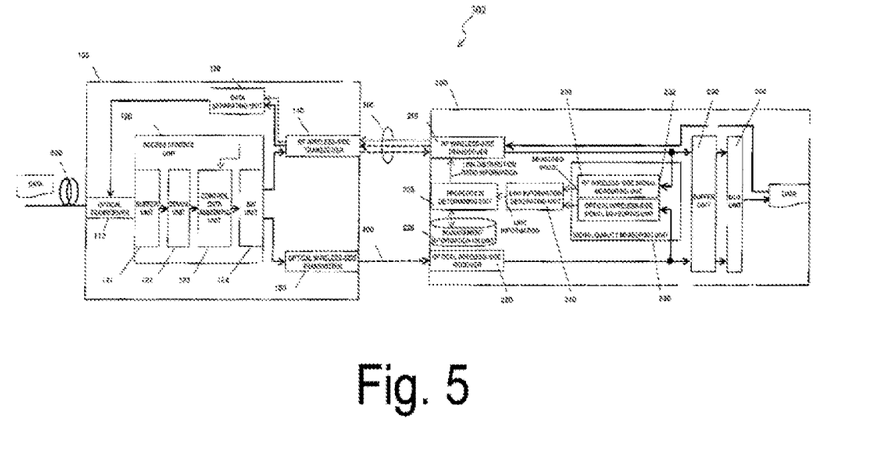
FIG. 5 is a diagram illustrating the optical/RF wireless hybrid communication system according to the present invention.

FIG. 5 is a diagram illustrating an optical/RF wireless hybrid communication system 302 according to this embodiment. Differences between the optical/RF wireless hybrid communication system 302 and the optical/RF wireless hybrid communication system 301 illustrated in FIG. 1 is the arrangement positions of a proportion determining unit and a management information DB unit. In other words, the optical/RF wireless hybrid communication system 302 has a proportion determining unit 225 and a management information DB unit 226 in a terminal 200 and does not have the proportion determining unit 125 and the management information DB unit 126 in a master station 100. The optical/RF wireless hybrid communication system 302 performs a proportion determination on the terminal side and feeds back link distribution ratio information to the master station side with being multiplexed into an RF wireless signal.

Next, the flow of data and control data will be described. Data transmitted to the master station 100 through a fiber transmission line 500 is received by an optical transceiver 110 as an optical signal and is converted to an electrical signal. The converted signal is buffered by buffer unit 121, and data is divided by a DEMUX unit 122. A method of dividing data is similar to that according to the first embodiment.

A control data assigning unit 123 assigns control data to a leading portion of the data divided by the DEMUX unit 122. The configuration of the control data is the same as that illustrated in FIG. 2. A distribution ratio between the RF wireless link and the optical wireless link is determined based on link distribution ratio information output from the proportion determining unit 225.

The data to which the control data has been assigned is distributed to the RF wireless link and the optical wireless link based on the link distribution information by the SW unit 124. An RF wireless-side transceiver 140 and an optical wireless-side transmitter 150 transmit data distributed from the SW unit 124 to the terminal 200 respectively through the RF wireless link 300 and the optical wireless link 400.

The transmitted data is converted into an electrical signal by the RF wireless-side transceiver 210 and the optical wireless-side receiver 220 inside the terminal 200 and then is processed to be received through identification, reproduction, and the like. Here, parts of signals output from the RF wireless-side transceiver 210 and the optical wireless-side receiver 220 are input to the signal quality measuring unit 230, and the signal quality is measured. The signal quality of the signal output from the RF wireless-side transceiver 210 is measured by the RF wireless-side signal quality measuring unit 231, and the signal quality of the signal output from the optical wireless-side receiver 220 is measured by the optical wireless-side signal quality measuring unit 232. Details of the measurement of the signal quality of each link are similar to those described in the first embodiment.

A measured value of the signal quality is input to the link information generating unit 240. Link information in which the signal quality and a measurement parameter of signals transmitted through the downlink RF wireless link and the optical wireless link are written is generated by the link information generating unit 240. Details of the link information are similar to those described in the first embodiment. The link information is input to the proportion determining unit 225.

The proportion determining unit 225 generates link distribution ratio information designating a distribution ratio between the links. Details of the link distribution ratio information are similar to those described in the first embodiment. The generated link distribution ratio information is input to the RF wireless-side transceiver 210 and is transmitted to the master station 100 through the RF wireless link.

The signals output from the RF wireless-side transceiver 210 and the optical wireless-side receiver 220 are buffered by the buffer unit 250 and then are re-combined by the MUX unit 260. The recombining process is the same as that described in the first embodiment. The recombined data is output from the terminal 200.

Also in this embodiment, it is preferable that only the RF wireless link should be used for the transmission of uplink data.

Uplink data generated inside the terminal 200 or outside the terminal 200 is transmitted to the master station 100 through the RF wireless link 300 by the RF wireless-side transceiver 210. At this time, as described above, the uplink data is multiplexed with the link distribution ratio information output from the proportion determining unit 225 and is transmitted to the master station 100. For the data that has been processed to be received by the RF wireless-side transceiver 140 of the master station 100, a process of separating the uplink data and the link distribution ratio information is performed by the data separating unit 130. Here, the link distribution ratio information separated by the data separating unit 130 is input to the control data assigning unit 123, and link distribution information corresponding to the link distribution ratio information is assigned to downlink data.

The uplink data separated by the data separating unit 130 is input to the optical transceiver 110. In the optical transceiver 110, an electrical signal from the data separating unit 130 is converted into an optical signal, and the optical signal is transmitted to a higher-rank network through the optical fiber transmission line 500.

In this way, the optical/RF wireless hybrid communication system 302 combines the RF wireless communication system using the RF wireless frequency band and the optical wireless communication system using the frequency band of the optical region, determines the link state from the signal quality of the signals received through both channels, and determines a distribution ratio between the links on the terminal side. Also the optical/RF wireless hybrid communication system 302 dynamically sets the proportion between the RF wireless link and the optical wireless link, and therefore effects similar to those of the optical/RF wireless hybrid communication system 301 described in the first embodiment can be acquired.

In addition, similar to the optical/RF wireless hybrid communication system 301 described in the first embodiment, the optical/RF wireless hybrid communication system 302 can handle the inbound system and the outbound system as well. In the case of the outbound system, a bandpass filter that transmits/blocks specific frequencies is used instead of the data separating unit 130.

Third Embodiment

Figure 6:
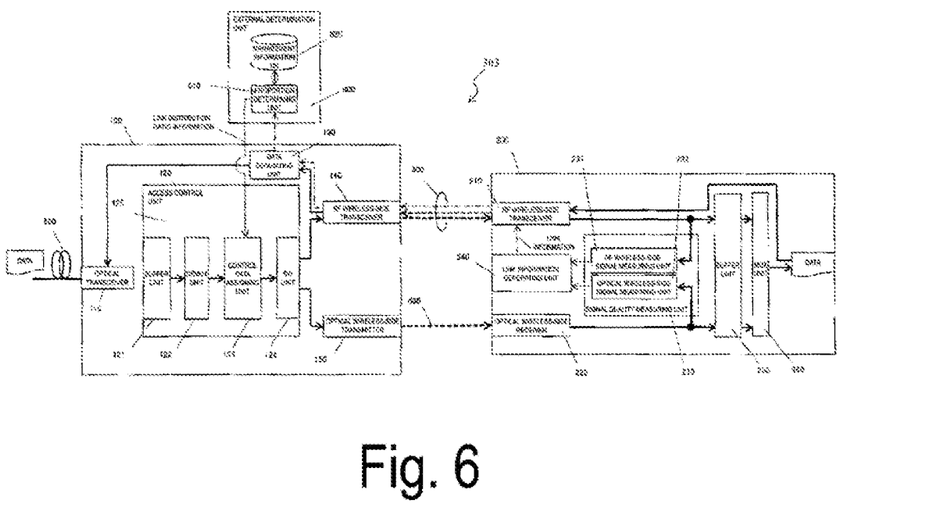
FIG. 6 is a diagram illustrating the optical/RF wireless hybrid communication system according to the present invention.

FIG. 6 is a diagram illustrating an optical/RF wireless hybrid communication system 303 according to this embodiment. Differences between the optical/RF wireless hybrid communication system 303 and the optical/RF wireless hybrid communication system 301 illustrated in FIG. 1 is the arrangement positions of a proportion determining unit and a management information DB unit. In other words, the optical/RF wireless hybrid communication system 303 arranges a proportion determining unit 610 and a management information DB unit 620 outside a master station 100 and a terminal 200 as external determination units 600 and does not have the proportion determining unit 125 and the management information DB unit 126 in the master station 100. The optical/RF wireless hybrid communication system 303 performs a proportion determination using the external determination unit 600 and feeds back link distribution ratio information to the master station side.

Next, the flow of data and control data will be described. Data transmitted to the master station 100 through a fiber transmission line 500 is received by an optical transceiver 110 as an optical signal and is converted to an electrical signal. The converted signal is buffered by buffer unit 121, and data is divided by a DEMUX unit 122. A method of dividing data is similar to that according to the first embodiment.

A control data assigning unit 123 assigns control data to a leading portion of the data divided by the DEMUX unit 122. The configuration of the control data is the same as that illustrated in FIG. 2. A distribution ratio between the RF wireless link and the optical wireless link is determined based on link distribution ratio information output from the proportion determining unit 610.

The data to which the control data has been assigned is distributed to the RF wireless link and the optical wireless link based on the link distribution information by the SW unit 124. An RF wireless-side transceiver 140 and an optical wireless-side transmitter 150 transmit data distributed from the SW unit 124 to the terminal 200 respectively through the RF wireless link 300 and the optical wireless link 400.

The process performed inside the terminal 200 is the same as that described in first embodiment. The terminal 200 multiplexes the generated link information into uplink data and transmits resultant data from the RF wireless-side transceiver 210 to the master station 100 through the RF wireless link.

Also in this embodiment, it is preferable that only the RF wireless link should be used for the transmission of uplink data.

For the data that has been processed to be received by the RF wireless-side transceiver 140 of the master station 100, a process of separating the uplink data and the link information is performed by the data separating unit 130. Here, the link information separated by the data separating unit 130 is input to the proportion determining unit 610 of the external determination unit 600.

The proportion determining unit 610 generates link distribution ratio information designating a distribution ratio between the links. Details of the generated link distribution ratio information are similar to those described in the first embodiment. This link distribution ratio information is generated by performing collation and determination of an optimal distribution ratio according to the signal quality of the links formed as a database by the management information DB unit 620 based on the link information generated by the terminal. The generated link distribution ratio information is sent to the control data assigning unit 123 inside the master station 100, and the link distribution information corresponding to the link distribution ratio information is assigned to downlink data.

The uplink data separated by the data separating unit 130 is input to the optical transceiver 110. In the optical transceiver 110, an electrical signal from the data separating unit 130 is converted into an optical signal, and the optical signal is transmitted to a higher-rank network through the optical fiber transmission line 500.

In this way, the optical/RF wireless hybrid communication system 303 combines the RF wireless communication system using the RF wireless frequency band and the optical wireless communication system using the frequency band of the optical region, determines the link state from the signal quality of the signals received through both channels, and determines a distribution ratio between the links using an external resource other than the master station and the terminal. Also the optical/RF wireless hybrid communication system 303 dynamically sets the proportion between the RF wireless link and the optical wireless link, and therefore effects similar to those of the optical/RF wireless hybrid communication system 301 described in the first embodiment can be acquired.

In addition, similar to the optical/RF wireless hybrid communication system 301 described in the first embodiment, the optical/RF wireless hybrid communication system 303 can handle the inbound system and the outbound system as well. In the case of the outbound system, a bandpass filter that transmits/blocks specific frequencies is used instead of the data separating unit 130.

Fourth Embodiment

In the first to third embodiments, a specific example in which, by determining the link state from the signal quality of each link, a proportion between the RF wireless link and the optical wireless link can be dynamically set, and a stable wireless communication system not depending on of the radio wave state and the communication band is realized has been described. In this embodiment, the stabilization of the signal transmission and performance of the process up to the generation of the link information at a high speed that are achieved by disposing a mechanism that measures a signal intensity of each link in a stage prior to a stage in which the signal quality is measured will be described.

Figure 7:
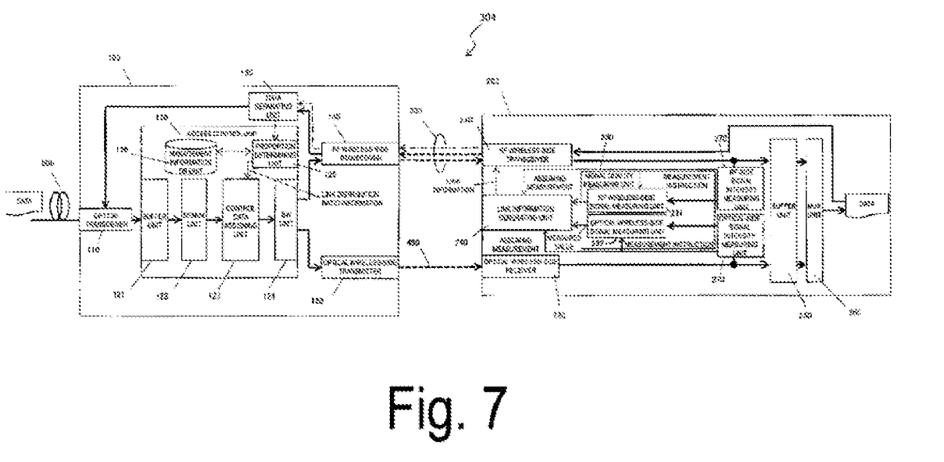
FIG. 7 is a diagram illustrating the optical/RF wireless hybrid communication system according to the present invention.

FIG. 7 is a diagram illustrating an optical/RF wireless hybrid communication system 304 according to this embodiment. The optical/RF wireless hybrid communication system 304 further includes a signal intensity measuring unit 270 in the terminal 200 of the optical/RF wireless hybrid communication system 301 illustrated in FIG. 1.

The signal intensity measuring unit 270 measures a signal intensity of data transmitted in a channel of an RF wireless link 300 and a signal intensity of data transmitted in a channel of an optical wireless link 400.

Thus, in a case that the measured signal intensity is higher than a predetermined threshold, the signal quality measuring unit 230 is caused to measure the signal quality of the data, and, in a case in which the measured signal intensity is lower than the predetermined threshold, the signal quality of the data is assumed to be measured to be specific quality without causing the signal quality measuring unit 230 to measure the signal quality of the data.

Figure 8:
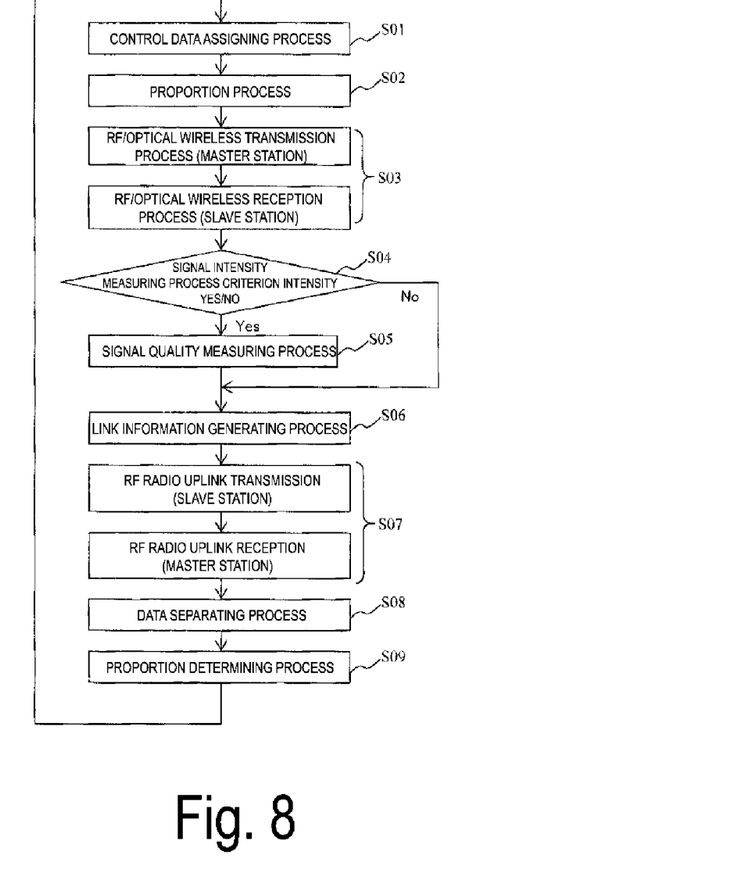
FIG. 8 is a diagram illustrating an operation of the optical/RF wireless hybrid communication system according to the present invention.

FIG. 8 is a flowchart illustrating a series of processes from a control data assigning process to a proportion determining process performed by the optical/RF wireless hybrid communication system 304. Data to which control data has been assigned is distributed to the RF wireless link and the optical wireless link based on the link distribution information (step S02). An RF or optical wireless transmission process is performed for the distributed data, and resultant data is transmitted through each link. An RF or optical wireless reception process is performed for the transmitted signal (step S03).

A signal intensity measuring process is performed for a part of the signal for which the reception process has been performed by the signal intensity measuring unit 270 (step S04). Then, in a case that a signal intensity higher than a threshold is measured ("Yes" in step S04), the signal quality measuring process is performed by the signal quality measuring unit 230 (step S05). On the other hand, in a case that the signal intensity is lower than the threshold ("No" in step S04), the signal quality measuring process is not performed by the signal quality measuring unit 230, and a result thereof is transmitted to the link information generating unit 240.

The link information generating unit 240 generates link information based on the measured signal quality (step S06). Here, in a case that the signal quality measuring process is not performed, the link information generating unit 240, for example, generates link information equivalent to link information of which signal quality is the worst in the table illustrated in FIG. 9 as link information to be generated.

The generated link information, as described in the first embodiment, is superimposed on an RF wireless uplink signal and is transmitted to the master station side (step S07). On the master station side, after the reception process, the link information is separated from the data by the data separating process (step S08). A proportion determining process is performed based on the separated link information, and link distribution ratio information is generated (step S09). Then, the link distribution information corresponding to the link distribution ratio information is assigned to the data of a downlink signal as control information (step S01).

In this way, by performing signal intensity measurement in a stage prior to the stage in which the signal quality is measured, signal quality measurement requiring a time can be avoided as much as possible, and link information can be generated quickly. In addition, by combining the signal intensity measurement and the signal quality measurement, the state of the signal can be acquired with a higher accuracy, and stable signal transmission can be realized.

Effects of Invention

According to the RF/optical wireless hybrid communication system of the present invention, in the background of diversification of network services and changes in the life style of final users, securement of frequency resources of the radio wave region and a high throughput in a wireless transmission section can be realized by combining an RF wireless communication system using a frequency band of the radio wave region and an optical wireless communication system using a frequency band of the light wave region. In addition, by providing a distribution method that determines the link state from the signal quality received in both channels of the RF wireless link and the optical wireless link and determines a proportion of data to be transmitted in each link based on the result of the determination, a stable wireless communication system not depending on the state of the radio wave and the communication band can be realized.

REFERENCE SIGNS LIST

100 Master station
110 Optical transceiver
120 Access control unit
121 Buffer unit
122 DEMUX unit
123 Control data assigning unit
124 SW unit (distribution unit)
125 Proportion determining unit
126 Management information DB unit
130 Data separating unit
140 RF wireless-side transceiver
150 Optical wireless-side transmitter
200 Terminal
210 RF wireless-side transceiver
220 Optical wireless-side receiver
225 Proportion determining unit
226 Management information DB unit
230 Signal quality measuring unit
231 RF wireless-side signal quality measuring unit
232 Optical wireless-side signal quality measuring unit
240 Link information generating unit
250 Buffer unit
260 MUX unit
270 Signal intensity measuring unit
300 RF wireless link
301 to 304 Optical/RF wireless hybrid communication system
400 Optical wireless link
500 Fiber transmission line
600 External determination unit
610 Proportion determining unit
620 Management information DB unit

The invention claimed is:

1. An optical/RF wireless hybrid communication system configured to transmit data using channels of an RF wireless link and an optical wireless link, the optical/RF wireless hybrid communication system comprising:
   one or more transmitters or transceivers;
   a signal quality measuring unit configured to measure signal quality of data transmitted in the channel of the RF wireless link and signal quality of data transmitted in the channel of the optical wireless link;
   a proportion determining unit configured to determine proportions of data to be transmitted in the channel of the RF wireless link and data to be transmitted in the channel of the optical wireless link based on the signal quality measured by the signal quality measuring unit; and
   a switching unit configured to distribute data to be transmitted to both or one of the channel of the RF wireless link and the channel of the optical wireless link based on the proportions determined by the proportion determining unit.

2. The optical/RF wireless hybrid communication system according to claim 1, further comprising a signal intensity measuring unit configured to:
   measure a signal intensity of the data transmitted in the channel of the RF wireless link and a signal intensity of the data transmitted in the channel of the optical wireless link, wherein, when the measured signal intensity is stronger than a predetermined threshold, the signal quality measuring unit is configured to measure the signal quality of the data, and when the measured signal intensity is weaker than the predetermined threshold, the signal quality of the data is considered to be of a specific quality without causing the signal quality measuring unit to measure the signal quality of the data.

3. The optical/RF wireless hybrid communication system according to claim 1, further comprising:
- a DEMUX unit configured to divide input data into data of a predetermined length;
- a control data assigning unit configured to assign control information based on the proportions determined by the proportion determining unit to the data divided by the DEMUX unit; and
- a MUX unit configured to recombine the data that is divided by the DEMUX unit and is transmitted through the channel of the RF wireless link or the channel of the optical wireless link based on the control information assigned to the data, wherein the switching unit distributes the data divided by the DEMUX unit to the channel of the RF wireless link or the channel of the optical wireless link based on the control information assigned to the data.

4. The optical/RF wireless hybrid communication system according to claim 1, wherein, in bidirectional communication, data is transmitted by distributing the data to both the channels of the RF wireless link and the optical wireless link in one direction, and data is transmitted using only the RF wireless link in the other direction.

5. A method of controlling an optical/RF wireless hybrid communication system configured to transmit data using channels of an RF wireless link and an optical wireless link, the method comprising:
- measuring signal quality of data transmitted in the channel of the RF wireless link and signal quality of data transmitted in the channel of the optical wireless link;
- determining proportions of data to be transmitted in the channel of the RF wireless link and data to be transmitted in the channel of the optical wireless link based on the signal quality measured; and
- distributing data to be transmitted to both or one of the channel of the RF wireless link and the channel of the optical wireless link based on the determined proportions.

6. The method according to claim 5, further comprising:
- measuring a signal intensity of the data transmitted in the channel of the RF wireless link and a signal intensity of the data transmitted in the channel of the optical wireless link;
- wherein, the signal quality of the data is measured when the measured signal intensity is stronger than a predetermined threshold, and when the measured signal intensity is weaker than the predetermined threshold, that the signal quality of the data is considered to be of a specific quality without performing the measuring of the signal quality.

7. The control method according to claim 5, further comprising:
- dividing input data into data of a predetermined length;
- assigning control information based on the determined proportions determined in the to the divided input data; and
- recombining the divided input data and in the dividing of the input data and is transmitted through the channel of the RF wireless link or the channel of the optical wireless link based on the control information assigned to the data, wherein the distributing of the data includes distributing the divided input data to the channel of the RF wireless link or the channel of the optical wireless link based on the control information assigned to the divided input data.

8. The control method according to claim 5, wherein, when the optical/RF-wireless hybrid communication system performs bidirectional communication, data is transmitted by distributing the data to both the channels of the RF wireless link and the optical wireless link in one direction, and data is transmitted using only the RF wireless link in the other direction.

* * * * *